United States Patent
Kurosawa

(10) Patent No.: US 7,590,339 B2
(45) Date of Patent: Sep. 15, 2009

(54) DIGITAL CAMERA INCLUDING MANUAL AND AUTOMATIC DRIVE OF PHOTOGRAPHING SYSTEM

(75) Inventor: Yuichi Kurosawa, Tokyo (JP)

(73) Assignee: HOYA Corporation, Tokyo (JP)

( * ) Notice: Subject to any disclaimer, the term of this patent is extended or adjusted under 35 U.S.C. 154(b) by 270 days.

(21) Appl. No.: 11/281,538

(22) Filed: Nov. 18, 2005

(65) Prior Publication Data

US 2006/0110150 A1 May 25, 2006

(30) Foreign Application Priority Data

Nov. 19, 2004 (JP) ............... 2004-335444

(51) Int. Cl.
*G03B 17/00* (2006.01)
(52) U.S. Cl. .............. 396/76; 396/77; 396/79; 396/80; 396/82; 396/103; 396/118; 396/133; 396/137; 348/208.99; 348/208.11; 348/208.12; 348/351
(58) Field of Classification Search ............. 396/76, 396/77, 79, 80, 82, 103, 118, 120, 133, 137; 348/208.99, 208.11, 208.12, 208.16, 298, 348/351, 352
See application file for complete search history.

(56) References Cited

U.S. PATENT DOCUMENTS

| | | | |
|---|---|---|---|
| 4,319,820 A * | 3/1982 | Ostrowski et al. ........... 396/137 |
| 4,947,239 A * | 8/1990 | Kondou et al. ............. 257/680 |
| 5,061,954 A * | 10/1991 | Toyama et al. ............. 396/103 |
| 5,214,513 A * | 5/1993 | Lee .................. 348/207.99 |
| 5,572,373 A * | 11/1996 | Imanari et al. ............ 359/825 |
| 5,583,602 A * | 12/1996 | Yamamoto ................. 396/133 |
| 5,701,208 A * | 12/1997 | Sato et al. .................. 359/822 |
| 5,819,583 A * | 10/1998 | Matsushima et al. .......... 74/7 E |
| 6,471,023 B2 * | 10/2002 | Nagaya et al. ............. 192/45.1 |
| 6,488,135 B1 * | 12/2002 | Kinoshita ................... 192/45 |
| 6,788,890 B2 | 9/2004 | Suzuki |
| 6,859,619 B2 | 2/2005 | Kurosawa |
| 2002/0134636 A1 * | 9/2002 | Ando ......................... 192/45 |
| 2003/0034218 A1 * | 2/2003 | Hu et al. .................... 192/45 |
| 2003/0141161 A1 * | 7/2003 | Ouchi ......................... 192/45 |
| 2005/0105899 A1 | 5/2005 | Hosokawa et al. |
| 2005/0254142 A1 | 11/2005 | Saito et al. |
| 2005/0254143 A1 | 11/2005 | Saito et al. |
| 2006/0104624 A1 * | 5/2006 | Nakata et al. ............... 396/137 |

FOREIGN PATENT DOCUMENTS

JP        2004-251999        9/2004

OTHER PUBLICATIONS

English language Abstract of JP 2004-251999.

* cited by examiner

*Primary Examiner*—Patrick J Assouad
*Assistant Examiner*—Michael A Strieb
(74) *Attorney, Agent, or Firm*—Greenblum & Bernstein P.L.C.

(57) ABSTRACT

A digital camera is provided with a photographing lens, an image capturing element, which is configured to capture an optical image of an object formed by the photographing lens, a coarse movement control system configured to control a position of the photographing lens in a direction of an optical axis by a motor, and a fine movement control system configured to control a position of an image receiving area of the image capturing element in the direction of the optical axis is provided.

8 Claims, 9 Drawing Sheets

DIGITAL CAMERA INCLUDING MANUAL AND AUTOMATIC DRIVE OF PHOTOGRAPHING SYSTEM

BACKGROUND OF THE INVENTION

The present invention relates to a digital camera having an AF (automatic focusing) mechanism, and particularly to such a digital camera having a function to switch mechanisms between the AF mechanism and an MF (manual focusing) mechanism.

In a digital SLR (single-lens reflex) camera with an AF mechanism, a part of an object image through a photographing lens unit is lead to an AF module, which evaluates the distance between the object and the camera. An image focusing operation is performed by a CPU, which is built inside the camera, driving a plurality of lenses that configure the photographing lens unit based on the evaluated distance. An example of such technique is disclosed in Japanese Patent Provisional Publication No. P2004-251999, which discloses a digital camera provided with an AF motor to generate rotary drive force. The rotary drive force is conveyed to the photographing lens unit, and drives some of the lenses in a direction of the optical axis to a focused position.

When AF is performed, the lenses are first driven to a relatively close point to the focused position in a coarse and fast movement, then driven in a fine and slow movement from the close point to the focused position. With these movements, focusing on the object is accomplished smoothly in a short time even when the lenses are apart from the focused position.

In an AF mechanism such as above, however, backlashes between various gears and screws configuring the AF mechanism often cause huntings, i.e., the lenses are not settled in the focused position, and focusing is not accomplished.

When the photographing lens unit of the camera with the AF mechanism is manually controlled, the lens drive mechanism needs to be detached from the AF motor. An example of such a switching mechanism to detach the AF motor is disclosed in U.S. Pat. No. 6,788,890, which discloses a switching mechanism operated manually. Such a manual switching operation may be troublesome, specifically when immediate switching from AF to MF is required, as releasing the AF mechanism and focusing manually may take time, and a right moment for photographing may pass.

SUMMARY OF THE INVENTION

Aspects of the present invention are advantageous in that a digital camera with an AF mechanism that is controlled accurately and speedily is provided. Also, aspects of the present invention are advantageous in that a digital camera that can be switched from AF to MF without releasing the focused lenses is provided.

According to some aspects of the present invention, there is provided a digital camera having a photographing lens, an image capturing element, which is configured to capture an optical image of an object formed by the photographing lens, a coarse movement control system, which is configured to control a position of the photographing lens in a direction of an optical axis by a motor, and a fine movement control system, which is configured to control a position of an image receiving area of the image capturing element in the direction of the optical axis.

Optionally, the fine movement control system may include a substrate to support the image capturing element, a driving system, which is configured to be elongated and contracted by being applied with voltage, and a plurality of link members, which are configured to support the substrate and convert the elongation and the contraction of the driving system to displacing force that displaces the substrate in the direction of the optical axis.

Optionally, the driving system may include a piezoelectric element.

Optionally, the photographing lens may be capable of being driven manually, and the fine movement control system may be configured to position the image receiving area of the image capturing element in an initial position when the photographing lens is manually driven.

Optionally, the digital camera may include a sensor, which is configured to detect a change in position of the photographing lens and output a detected result, and a processing unit, which is configured to recognize the photographing lens is driven manually based on the detected result by the sensor.

Optionally, the processing unit may be configured to recognize that the photographing lens is driven manually when the detected result is output from the sensor while the power applied to the motor is stopped.

Optionally, the digital camera may include a one-way clutch system, which is configured to connect the motor and the photographing lens. The driving force of the motor may be conveyed to the photographing lens through the one-way clutch system and the motor nay remain unaffected while the photographing lens is manually driven.

BRIEF DESCRIPTION OF THE ACCOMPANYING DRAWINGS

DETAILED DESCRIPTION OF THE EMBODIMENT

Referring to the accompanying drawings, a digital camera according to an embodiment of the invention will be described in detail.

Figure 1:
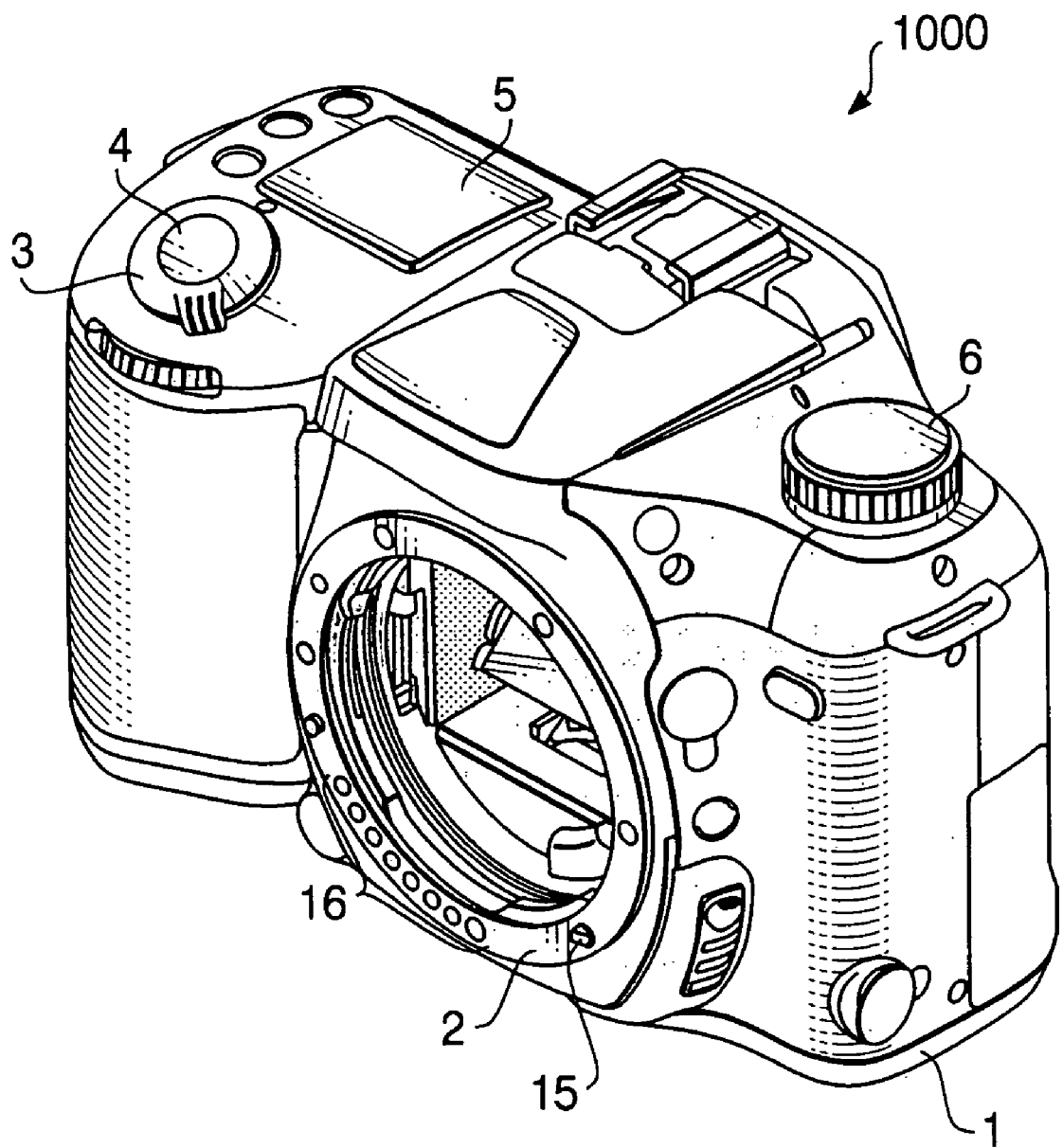
FIG. 1 is a perspective view showing an appearance of a digital camera according to an embodiment of the present invention.

FIG. 1 is a perspective view showing an appearance of a digital camera according to an embodiment of the present invention. The digital camera 1000 is a digital SLR camera employing interchangeable lens system. As shown in FIG. 1, the camera 1000 has a camera body 1. On a front surface of the camera body 1, a lens mount 2 is provided, to which a photographing lens unit (not shown) is detachably attached. The lens mount 2 is provided with an AF coupler 15 to control an AF operation by driving some of a plurality of lenses configuring the photographing lens unit in a direction of the optical axis. The lens mount 2 is also provided with a plurality of contact pins 16 for transmitting and receiving electronic signals to/from the photographing lens unit. On the upper surface of the camera body 1, a main switch 3 having a rotary lever, a release button 4 to be pressed, an LCD (liquid crystal display) 5 for displaying various information and captured images, and a mode dial 6 for setting various photographing modes are provided. The release button 4 functions as a photometry switch when half-depressed and a release switch when fully depressed.

Figure 2:
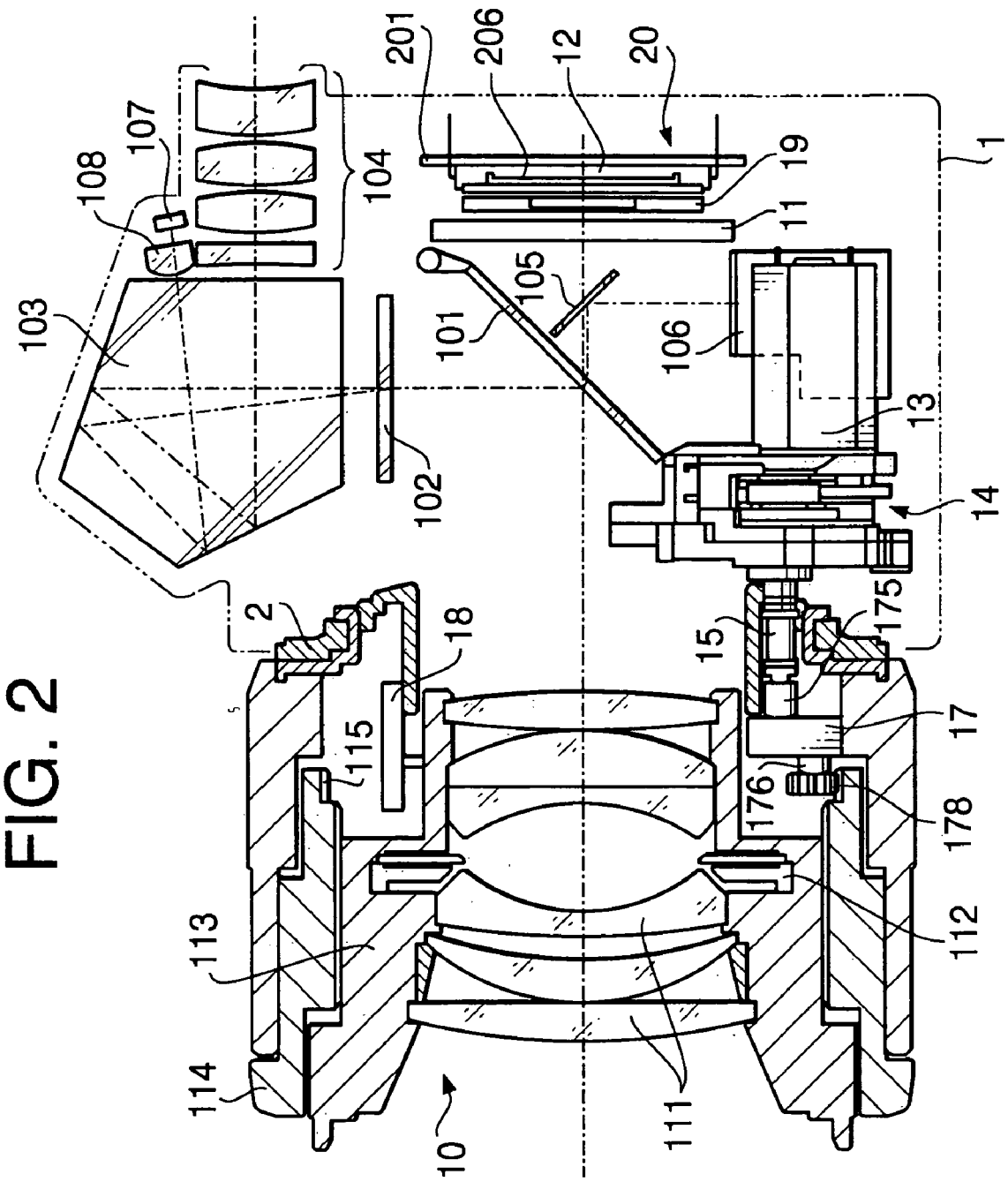
FIG. 2 is a cross-sectional view showing an internal structure of the digital camera according to the embodiment of the present invention.

FIG. 2 is a cross-sectional side view showing an internal structure of the digital camera with a photographing lens unit 10 attached according to the embodiment of the present invention. Light from an object passed through the photographing lens unit 10 is reflected by a movable half mirror (quick return mirror) 101 and forms an image on a focusing glass 102. The image formed on the focusing glass 102 is further reflected inside a pentaprism 103 and can be observed through an eyepiece lens 104. The image passed through the movable half mirror 101 is transmitted through a shutter 11 and received by an image pickup device 12 such as a CCD (Charge Coupled Device) or a MOS (Metal Oxide Semiconductor), which outputs imaging signals representing the received optical image. The image pickup device 12 is configured to be finely driven in the direction of the optical axis by an image pickup device driving mechanism, which will be described hereinbelow. The image passed through the movable half mirror 101 is further reflected by a second mirror 105 and received by an AF module 106, which serves as a distance measuring device to evaluate a distance to the object. Based on the evaluated distance, a CPU 100 drives an AF motor 13, which rotates an AF drive mechanism and the AF coupler 15. A photometer 107 that evaluates the amount of the light through a condenser 108 is provided in a vicinity of the eyepiece lens 104.

The photographing lens unit 10 is provided with a plurality of lenses 111 and a diaphragm 112, which are supported by a lens frame 113. The lens frame 113 is helicoidally attached to a focusing ring 114, which is provided at an outer periphery of the lens frame 113. The focusing ring 114 is configured to drive the lens frame 113 in the direction of the optical axis when the focusing ring 114 is rotated around the optical axis, and the lenses 111 supported by the lens frame 113 are driven in conjunction with the lens frame 113 to focus on the object. At an inner edge of the focusing ring 114 is integrally formed an inner gear 115. Further, the inner gear 115 coupled to a one-way clutch 17, which is driven by the AF coupler 15. Inside the photographing lens unit 10 is provided a position sensor 18, which includes a potentiometer, an encoder, and the like to detect the position of the lens frame 113 in the direction of optical axis.

Figure 3:
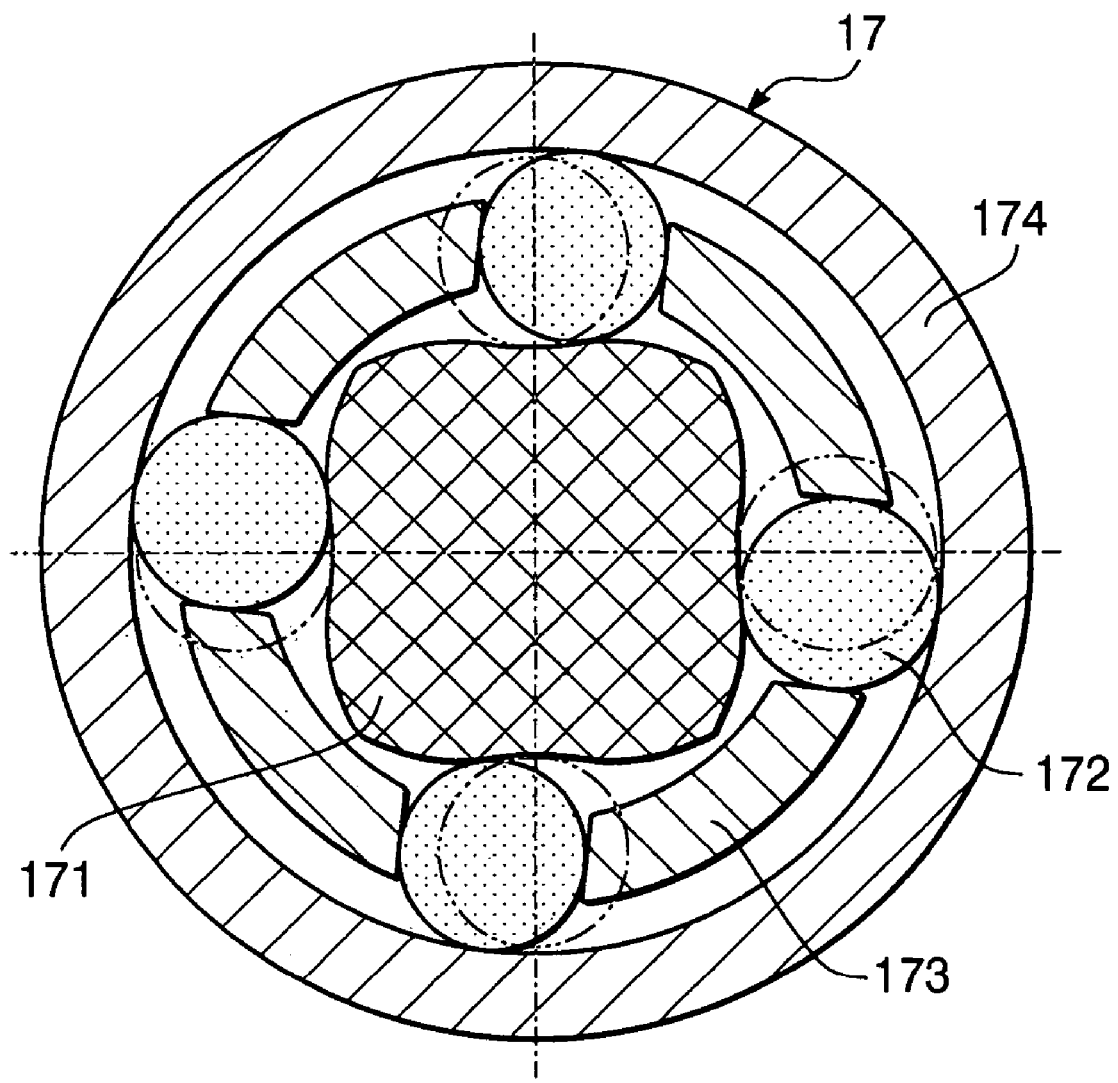
FIG. 3 is a cross-sectional view of a mechanism of a one-way clutch according to the embodiment of the invention.

FIG. 3 is a cross-sectional view of a mechanism of a one-way clutch according to the embodiment of the invention. As shown in FIG. 3, the one-way clutch 17 has an inner rotary member 171, four rolling members 172, a restriction ring 173 and a circular rotary member 174. The cross-sectional surface of the inner rotary member 171 has a shape of an approximate petal-like square, and the outer periphery thereof serves as a cam. The rolling members 172 are provided to contact each side of the inner rotary member 171. Movement of each rolling member 172 on the circumferential surface of the inner rotary member 17 is restricted by the restriction ring 173.

Figure 4:
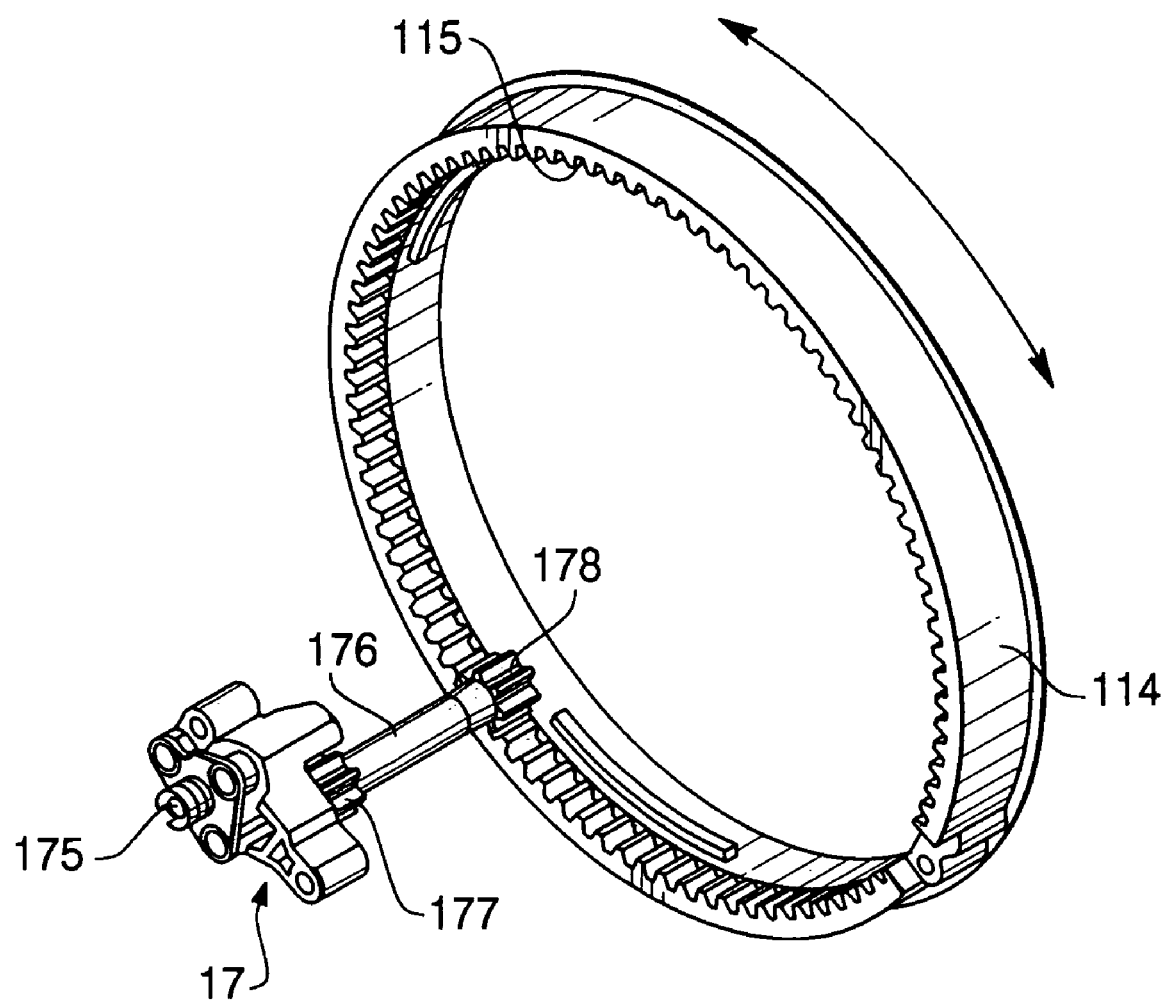
FIG. 4 is a perspective view of main components of the one-way clutch system according to the embodiment of the invention.

The circular rotary member 174 is provided to surround the rolling members 172 so that the inner periphery of the circular rotary member 174 is in contact with each rolling member 172. An input shaft 175 (see FIG. 4), which is integrally provided to the inner rotary member 171, is connected concentrically with the AF coupler 15. The outer periphery of the inner rotary member 171 is provided with a gear (not shown), which is engaged with a gear 177. The gear 177, fixed to one end of the output shaft 176, is rotatably supported by the one-way clutch 17. The output shaft 176 is provided with a small gear 178 at the other end, which is engaged with an inner gear 115 of the focusing ring 114.

When the motor 13 is driven and the inner rotary member 171 is rotated through the AF drive mechanism 14 and the AF coupler 15, the rolling members 172 rotate in the same direction as the rotating direction of the inner rotary member 171. Simultaneously, the rolling member 172 is conveyed from a concave area to a salient area of the cam of the inner rotary member 171. Thus, the restriction ring 173 is rotated in the opposite direction to the rotating direction of the inner rotary member 171. Subsequently, the rolling members 172 become locked between the salient area of the cam and the inner periphery of the circular rotary member 174. Thus, the rotating force of the inner rotary member 171 is conveyed to the circular rotary member 174, and the circular rotary member 174 is rotated along with the inner rotary member 171. Then, the inner gear 115 is rotated through the output shaft 176, and accordingly, the focusing ring 114 is rotated and the lenses 111 are driven in the direction of the optical axis to focus on the object.

When the focusing ring 114 is rotated manually, the lenses 111 are also driven in the direction of the optical axis. When the focusing ring 114 is rotated, the inner gear 115 is rotated, and the circular rotary member 174 is rotated through the output shaft 176. By rotating the circular rotary member 174, the rolling members 172, which are in contact with the inner periphery of the circular rotary member 174, are rotated. However, each rolling member 172 idles in the concave area of the cam, therefore, the rotating force from the circular rotary member 174 is not conveyed to the restriction ring 173, and the inner rotary member 171 remains motionless. Accordingly, the AF drive mechanism 14 and the AF motor 13 remain unaffected, and thus, manual focusing is smoothly performed.

Figure 5:
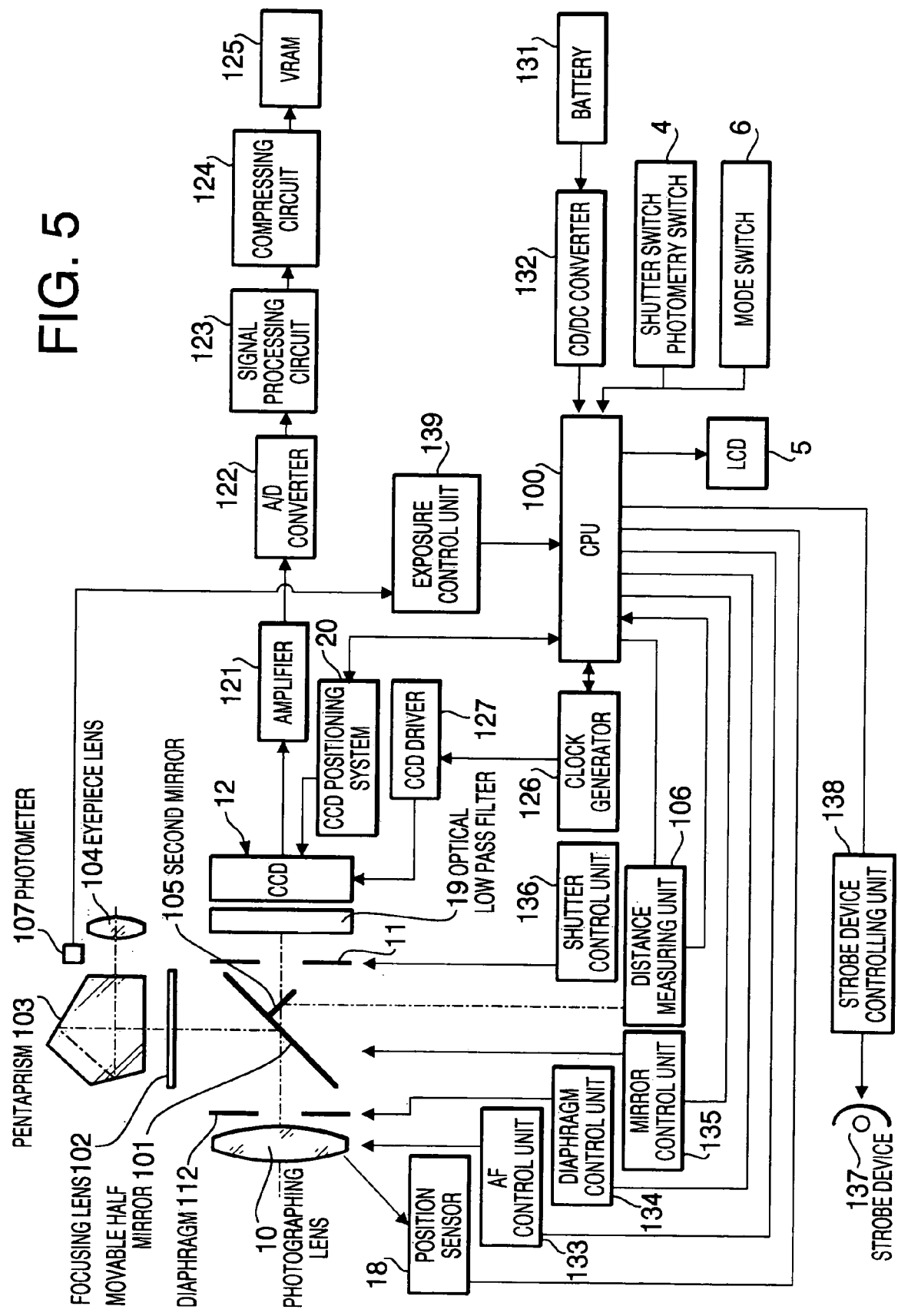
FIG. 5 is a block diagram illustrating an electrical configuration of the digital camera according to the embodiment of the invention.

FIG. 5 is a block diagram illustrating an electrical configuration of the digital camera according to the embodiment of the invention. When an image is captured, the shutter is released and the movable half mirror 101 is uplifted. The image through the photographing lens unit 10 is transmitted through an optical low pass filter 19 and captured by the image pickup device 12. The captured signals (i.e., image signals) are amplified by an amplifier 121, and converted to digital image signals by an A/D (analog-to-digital) converter 122. To the digital image signals, a color processing, a gamma processing and the like are applied in a signal processing circuit 123. The processed image signals are then compressed by a compressing circuit 124 (or may not be compressed), and stored in a VRAM (video RAM) 125. The CPU 100 contains a clock generator 126. In accordance with a clock signal output by the clock generator 126, the CPU 100 controls an imaging element driver (CCD driver) 127 to set storage time in the image pickup device 12 to store the image signals.

The CPU 100 uses output of a DC/DC converter 132, which uses DC/DC converted voltage of a battery 131, as a power source. When the image is captured, a shutter speed and an aperture value are determined based on exposure information evaluated by the photometer 107 and output from an exposure control unit 139, which obtains a proper value for exposure. Then the CPU 100 controls the diaphragm control unit 134 and the shutter unit 136 to open/shut the shutter 11. The CPU 100 further controls a mirror control unit 135 to operate the movable half mirror 101. The AF module 106 (i.e., distance measuring device) evaluates the distance to the object, and the CPU 100 controls the AF motor 13 and an AF control unit 133, which includes the AF drive mechanism 14 to focus on the object. Furthermore, the CPU 100 is provided with information from the position sensor 18, which is provided to the photographing lens unit 10. The CPU 100 controls the LCD 5 to display various information for photographing and a monitor LCD (not shown) to display captured images. The CPU 100 also controls a strobe device controlling unit 138, which controls the strobe device 137 to emit light.

The image pickup device 12 is provided with an image pickup device positioning mechanism 20. The CPU 100 is configured to control a position of the image pickup device 12 in the direction of the optical axis by providing predetermined voltage to the image pickup device positioning mechanism 20.

Figure 6:
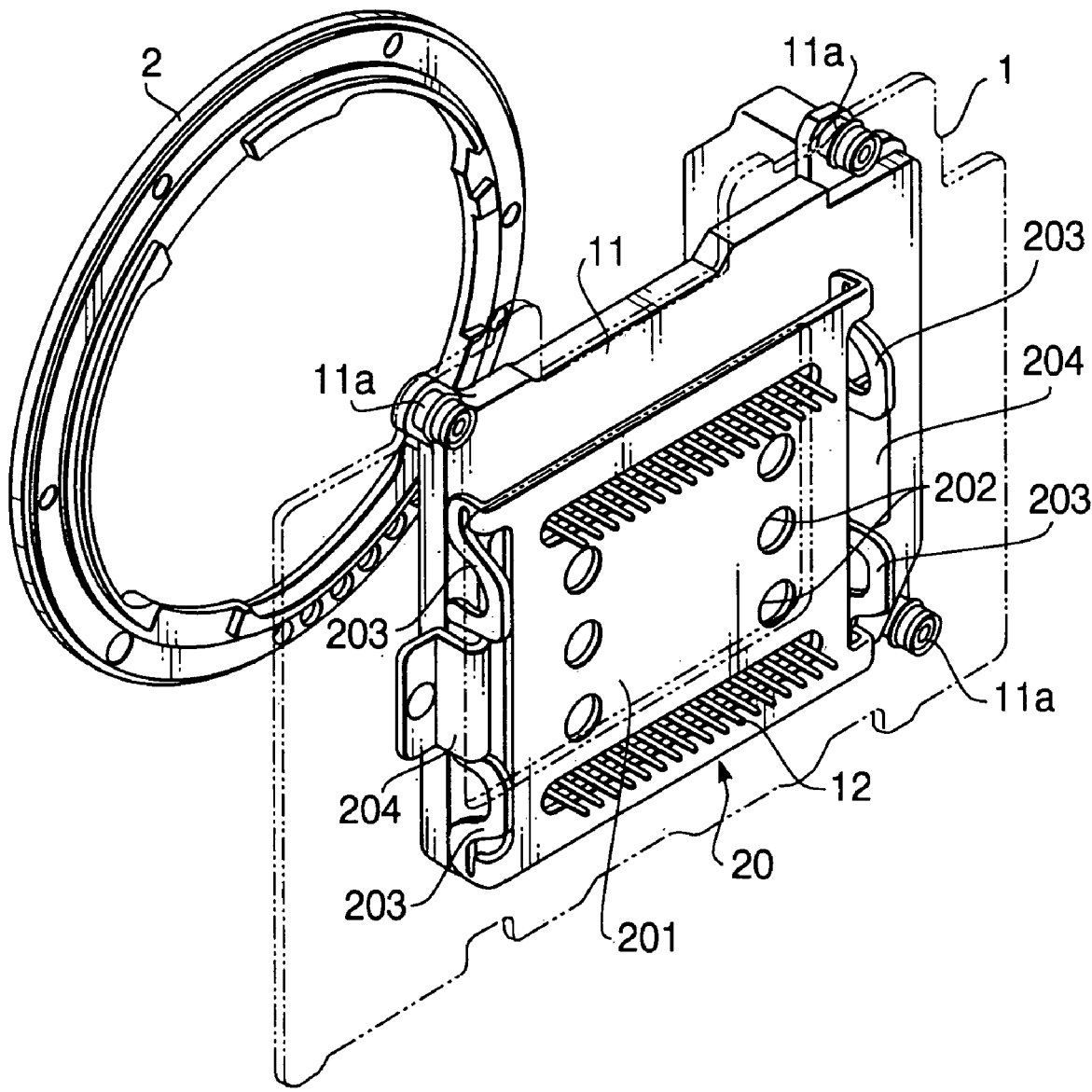
FIG. 6 is a perspective view from the back of an image pickup device positioning mechanism according to the embodiment of the invention.
Figure 7:
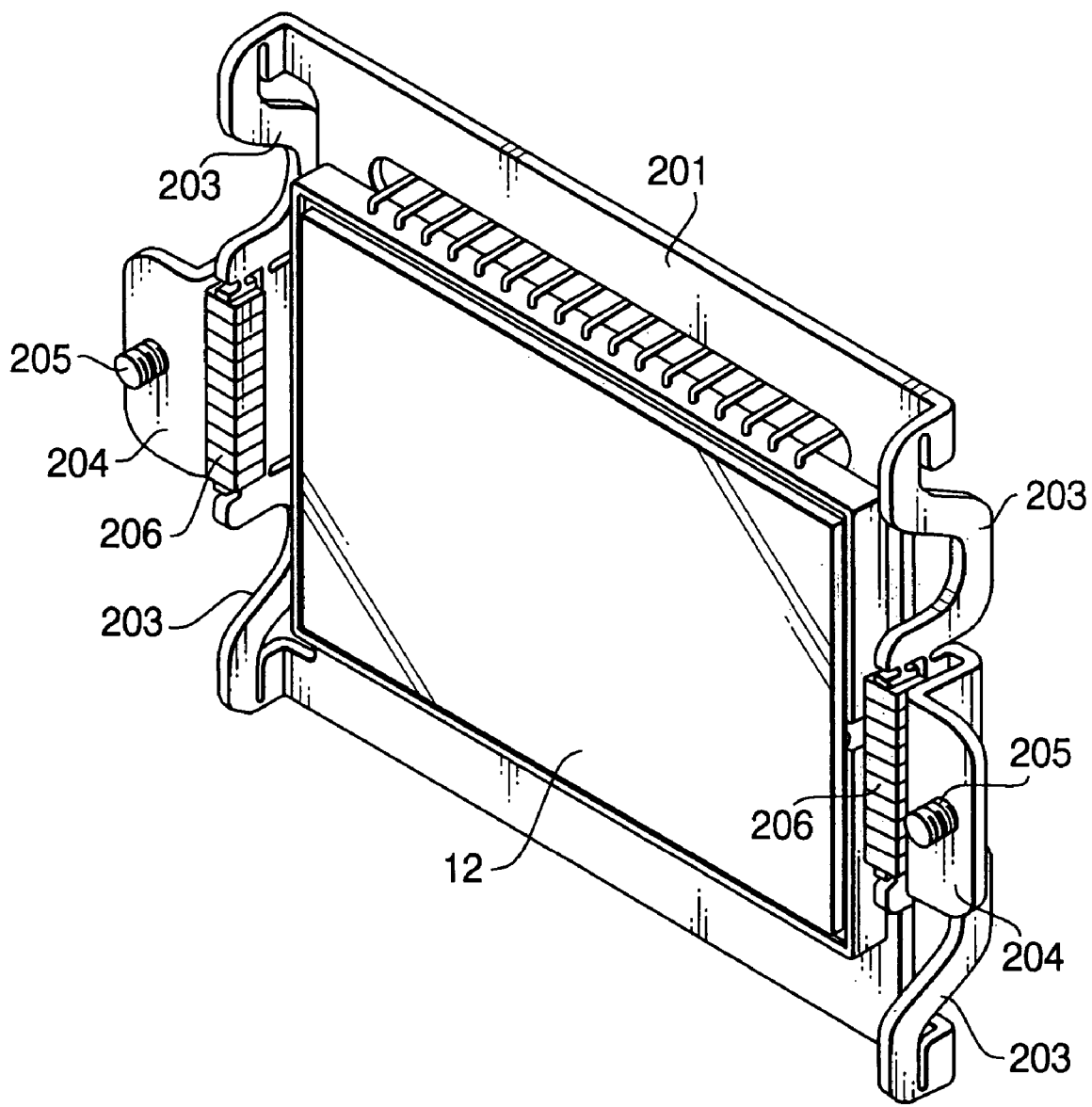
FIG. 7 is a perspective view from the front of an image pickup device positioning mechanism according to the embodiment of the invention.

FIG. 6 is a perspective view from the back of the image pickup device positioning mechanism 20 according to the embodiment of the invention. FIG. 7 is a perspective view from the front of an image pickup device positioning mechanism 20. The image pickup device 12 is fixed to a substrate 201, which is formed with a plurality of openings 202. The image pickup device 12 is fixed to the substrate 201 at the back with the adhesive agent injected through the openings 202. The substrate 201 is provided at each corner with a displacement magnifying link 203. At each vertical side of the substrate 201, a clasp 204 is provided respectively to be coupled with each pair of the displacement magnifying links 203. With the clasps 204 and screws 205, the substrate 201 is screwed to the interior of the camera body 1 behind the shutter 11. The shutter 11 is fixed to shutter fixtures 11a, which are attached to the interior of the camera body 1, with screws (not shown).

Figure 8A:
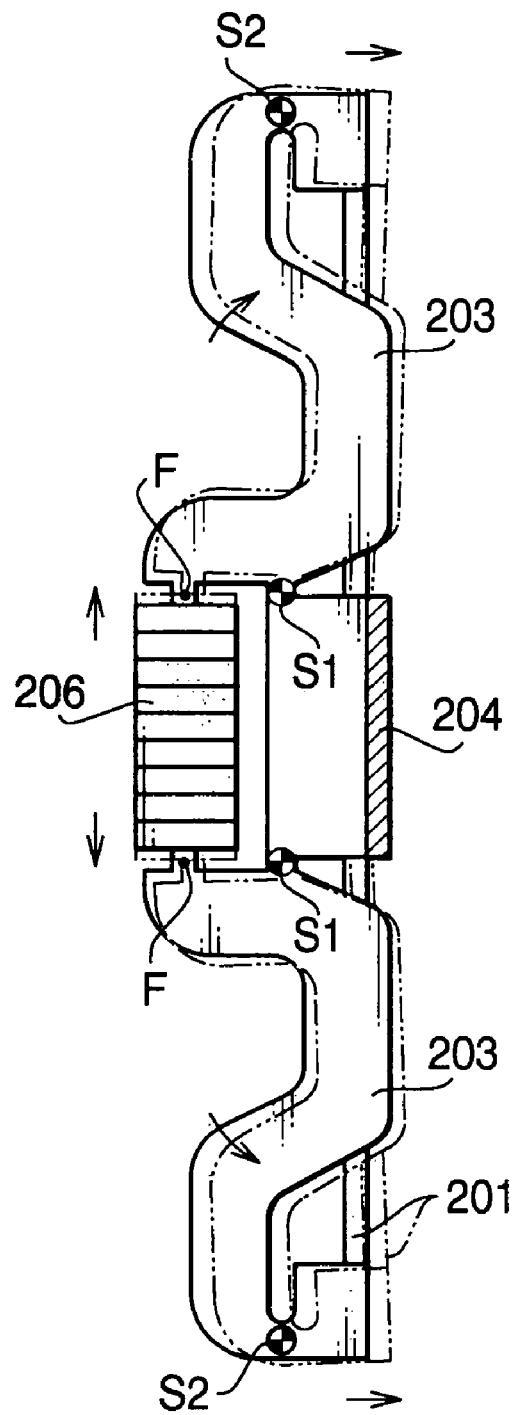
FIGS. 8A and 8B are side views illustrating a mechanism of a displacement magnifying link according to the embodiment of the invention.
Figure 8B:
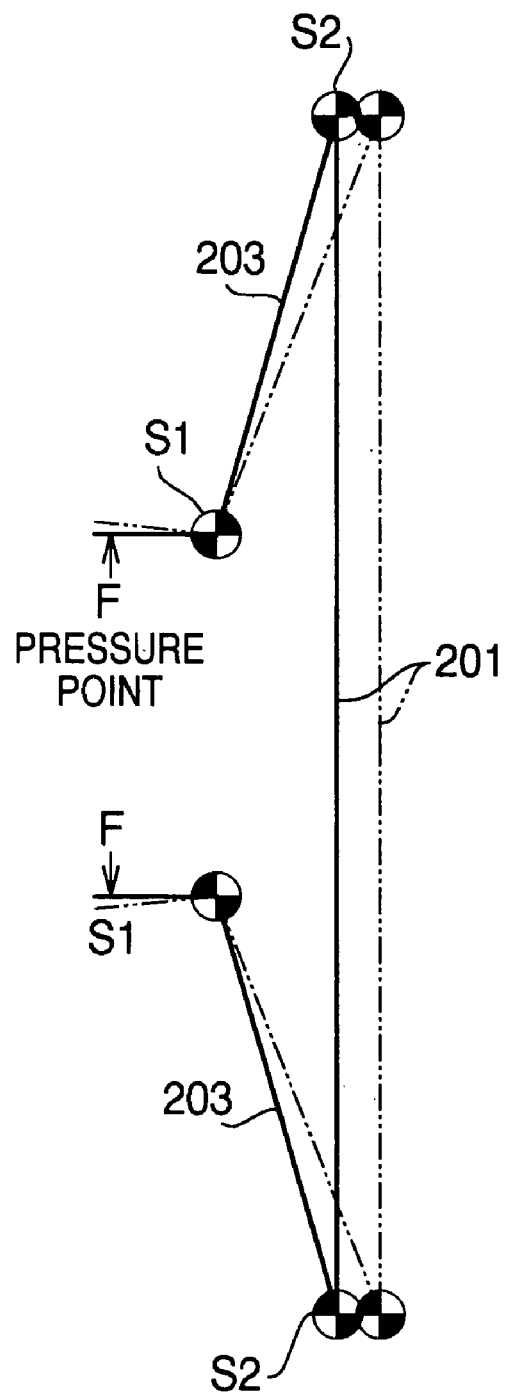

FIGS. 8A and 8B are side views illustrating a mechanism of the displacement magnifying link according to the embodiment of the invention. As shown in FIG. 8A, each displacement magnifying link 203 is formed to have a shape of S. Each displacement magnifying link 203 is attached to the clasp 204 by a first supporting portion S1 and to the substrate 201 by a second supporting portion S2. Each clasp 204 is configured to hold a layered piezoelectric actuator 206, which includes a plurality of vertically layered piezoelectric elements. Each of an upper surface and a lower surface of the layered piezoelectric actuator 206 is coupled with one end of the displacement magnifying link 203, which is closer to the first supporting point S1, and the contact point of the layered piezoelectric actuator 206 and the displacement magnifying link 203 is configured to be a pressure point F. Each layered piezoelectric actuator 206 is connected to a conductive lead (not shown), and through the conductive lead, predetermined voltage is applied to each layered piezoelectric actuator 206.

The layered piezoelectric actuators 206 are adapted to be in a normal state thereof when initial voltage is being applied to the layered piezoelectric actuators 206. Also the displacement magnifying links 203 are in the normal state thereof, and are adapted to hold the substrate 201 in a predetermined initial position. The normal state of the displacement magnifying links 203 corresponds to the solid line shown in FIG. 8B.

When predetermined voltage that is different from the initial voltage is applied to the layered piezoelectric actuators 206, the layered piezoelectric actuators 206 are elongated vertically, as shown in the dotted line in FIG. 8B. Thus, the pressure points F of the displacement magnifying links 203 are displaced outward as indicated by the arrows in FIG. 8B, and the displacement magnifying links 203 are forced to incline toward the substrate 201 for a small angle supported by the first supporting points S1. As a result, the second supporting points S2 are displaced in the direction of the optical axis. The amount of the displacement of the second supporting points S2 magnified by a leverage of the length ratio between the length from the pressure points F and the first supporting points S1 and the length from the first supporting points S1 and the second supporting points S2. With this action, the substrate 201 is displaced backward relatively to the clasps 204 in the direction of the optical axis, and accordingly the image pickup device 12 fixed to the substrate 201 is displaced in the direction of the optical axis.

Figure 9:
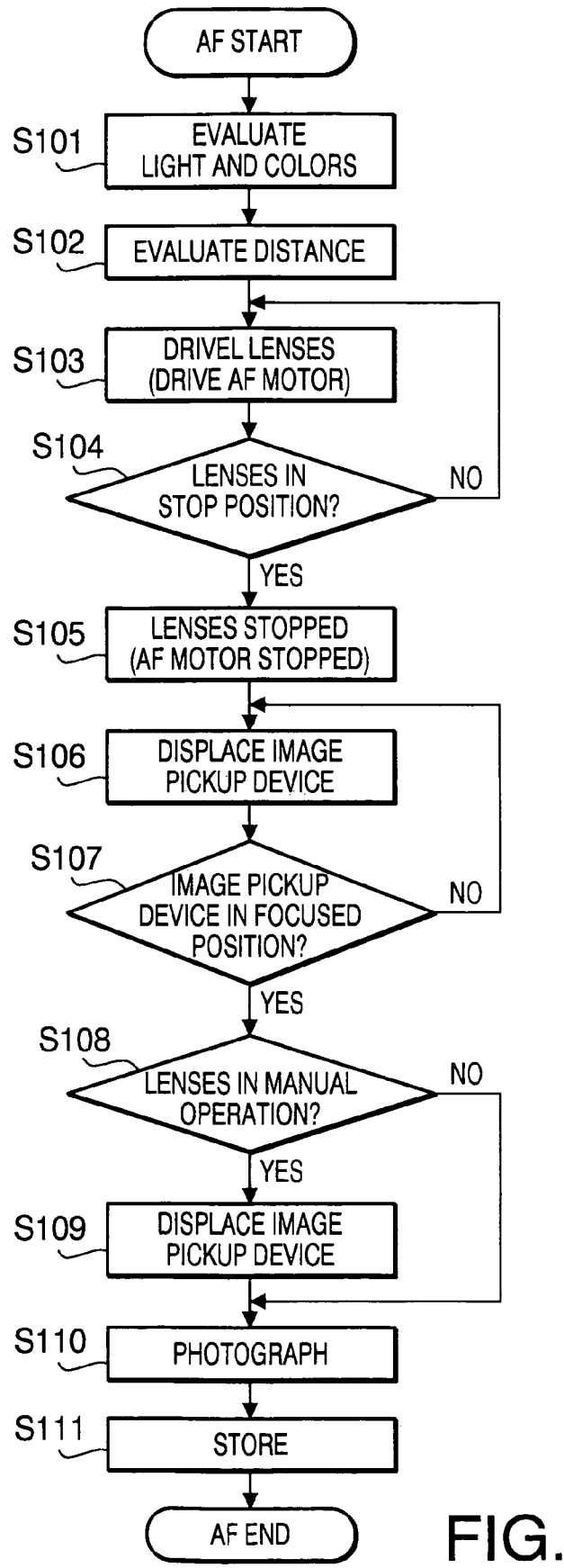
FIG. 9 is a flowchart illustrating a focusing operation according to the embodiment of the invention.

FIG. 9 is a flowchart illustrating a focusing operation according to the embodiment of the invention. In S101, the photometer 107 evaluates the light from the object and colors of the object. In S102, the AF module (the distance measuring device) 106 evaluates the distance to the object. The CPU 100 calculates a focused position of the lenses 111 in the photographing lens unit 10 based on the evaluated distance. In S103, the CPU 100 controls the AF control unit 133 and drives the AF motor 13, and the lenses 11 are displaced by the AF drive mechanism 14 in the direction of the optical axis. In this step, the AF motor 13 is adapted to be driven in a faster speed, or the AF drive mechanism 14 is adapted to reduce the speed in a smaller moderation ratio. With this structure, drive speed of the lenses 111 is maintained relatively fast, and the lenses are displaced in a short time to predetermine stop position, which are in the vicinity of AF positions. Driving the lenses in the faster speed as described above is referred to as coarse movement control in the present embodiment. In S104, when the lenses 111 are displaced to the stop positions (S104: YES), the process proceeds to S105. In S105, the CPU 100 stops driving the AF motor 13.

In S106, the CPU 100 controls the image pickup device positioning mechanism 20 to apply predetermined voltage to the layered piezoelectric actuators 206. With this voltage, the layered piezoelectric actuators 206 are elongated or contracted vertically, and the pressure points F of the displacement magnifying links 203 are displaced vertically, accordingly the substrate 201 and the image pickup device 12 fixed to the substrate 201 are displaced in the direction of the optical axis. In S107, the CPU 100 controls the voltage to be applied to the layered piezoelectric actuators 206 based on the evaluated distance by the AF module 106 and amount of displacement of the lenses 111, which are driven in the previous coarse movement control, and drives the image pickup device 12 finely in the direction of the optical axis to be positioned in the focused position. Driving the image pickup device 12 in the direction of the optical axis in fine motion is referred to as fine movement control in the present embodiment. By driving the image pickup device 12 in the fine movement control, the image receiving area of the image pickup device 12 is in a position for the image of the object to be focused.

With the above configuration, required accuracy of the AF motor 13 to drive the lenses 111 is relaxed, and the lenses 111 are displaced in the focused position in a fast motion, while the huntings of the lenses caused by the AF motor 13 is prevented. When the image pickup device 12 is driven in the fine movement control, backlashes between gears and screws configuring the image pickup device positioning mechanism 20 is considerably reduced, as the fine movement control is conducted by the elongation/contraction of the layered piezoelectric actuators 206. Therefore, the lenses are controlled to the AF position in a fast operation, and operational readiness of AF is accomplished.

In the present embodiment, the CPU 100 continuously monitors the output from the position sensor 18 after the completion of the AF control in S107. When the position sensor 18 outputs a change in the position of the lens frame 113, the CPU 100 recognizes that the lenses 111 are displaced by a manual operation to the focusing ring 114, and the process proceeds to S108 to control the image pickup device positioning mechanism 20 in MF control. In S108, the CPU 100 controls the image pickup device positioning mechanism 20 to apply predetermined initial voltage to the layered piezoelectric actuators 206. With the change of the voltage, the layered piezoelectric actuators 206 are released to the initial length. In S109, the displacement of the displacement magnifying links 203 is conveyed to the substrate 201, and the image receiving area of the image pickup device 12 is returned to the initial position. With this operation, the image of the object is reflected on the image receiving area of the image pickup device 12 as viewed through the finder. Thus, a user is allowed to adjust focusing by viewing the image through the finder in manual operation. In S110, the image of the object is photographed by the image pickup device 12 after the image is properly focused by the AF or the MF operation. In S111, image data captured from the image pickup device 12 is stored in the image memory 125, and the process completes.

As described above, when the AF control is switched from the MF control, the image pickup device 12 is returned to the initial position. Thus, the position of the image receiving area of the image pickup device 12 is optically equivalent to the position of the focusing glass 102, and the user is allowed to focus manually through the finder. In such case, switching from the AF control to the MF control requires the user to merely operate manually the focusing ring 114. Thus, no other operation specifically to switch controls from AF to MF is required, and manual focusing is performed in a short time.

The CPU 100 may switch controls from AF to MF immediately when the CPU 100 recognizes the output from the position sensor 18 exceeds an expected range, even during the CPU 100 is driving the AF motor 13 in AF control. It may be configured as such that after the control is switched from AF to MF and a predetermined period is passed, the control is switched from MF back to AF when no change is output from the position sensor 18.

In the above-described embodiment, a digital SLR camera with an AF mechanism. However, the invention is not limited to such camera, and digital cameras employing an AF control by an AF motor can employ the invention. It should be noted that digital cameras that are capable of photographing in MF control by viewing objects through finders can employ the invention.

The shape of the cross-sectional surface of the inner rotary member 171 is not limited to a petal-like square, but may be other polygonal shape, as long as the circumferential surface of the inner rotary member 171 has a plurality of concave areas and a plurality of salient areas. Also, it should be noted that the number of the rolling members 172 is not limited to four, but may be other number depending on the numbers of the concave areas and the salient areas of the circumferential surface of the inner rotary member 171.

The present disclosure relates to the subject matter contained in Japanese Patent Application No. 2004-335444, filed on Nov. 19, 2004, which is expressly incorporated herein by reference in its entirety.

What is claimed is:

1. A digital camera comprising:
    a photographing lens, the photographing lens being capable of being driven manually;
    an image capturing element configured to capture an optical image of an object formed by the photographing lens;
    a coarse movement control system, which is configured to control a position of the photographing lens in a direction of an optical axis by a motor,
    a fine movement control system, which is configured to control a position of an image receiving area of the image capturing element in the direction of the optical axis; and
    a one-way clutch system, which is configured to connect the motor and the photographing lens,
    wherein a driving force of the motor is transmitted to the photographing lens through the one-way clutch system, while when the photographing lens is manually driven, and the photographing lens is controlled by the motor, the motor is not affected.

2. The digital camera according to claim 1,
    wherein the fine movement control system comprises:
    a substrate to support the image capturing element;
    a driving system, which is configured to be elongated and contracted by application of a voltage; and
    a plurality of link members, which are configured to support the substrate and convert the elongation and the contraction of the driving system to displacing force that displaces the substrate in the direction of the optical axis.

3. The digital camera according to claim 2, wherein the driving system includes a piezoelectric element.

4. The digital camera according to claim 1,
    wherein the fine movement control system is configured to position the image receiving area of the image capturing element in an initial position when the photographing lens is manually driven.

5. The digital camera according to claim 1, further comprising:
    a sensor, which is configured to detect a change in position of the photographing lens and output a detection result, and
    a processing unit, which is configured to determine that the photographing lens is driven manually based on the detection result by the sensor.

6. The digital camera according to claim 5, wherein the processing unit determines that the photographing lens is driven manually when the detection result is output from the sensor while power applied to the motor is stopped.

7. The digital camera according to claim 1, wherein, once the photographing lens has been manually driven, the photographing lens automatically changes to be controlled by the motor upon expiration of a predetermined time period without another manual drive.

8. The digital camera according to claim 1, the one-way clutch system comprising:
    an inner rotary member, which is rotated by driving force of the motor, a circumferential surface of the inner rotary member having a plurality of concave areas and a plurality of salient areas;
    a plurality of rolling members, which are positioned to be in contact with the inner rotary member;

a restriction ring, which restricts movement of the plurality of rolling members on the circumferential surface of the inner rotary member; and a circular rotary member, which surrounds the rolling members so that the inner periphery of the circular rotary member is in contact with each rolling member, wherein the driving force of the motor is conveyed to the photographic lens through the one-way clutch system and when the photographic lens is manually driven the motor is not affected.

* * * * *